US011465502B1

(12) United States Patent
Fisker et al.

(10) Patent No.: US 11,465,502 B1
(45) Date of Patent: Oct. 11, 2022

(54) ROTATING VEHICLE CENTER INFORMATION DISPLAY WITH STATIONARY BUTTONS AND TOUCH BAR

(71) Applicant: FISKER INC., Manhattan Beach, CA (US)

(72) Inventors: Henrik Fisker, Manhattan Beach, CA (US); Todd Omotani, Manhattan Beach, CA (US); Nadya Arnaout, Manhattan Beach, CA (US)

(73) Assignee: Fisker Inc., Los Angeles, CA (US)

( * ) Notice: Subject to any disclaimer, the term of this patent is extended or adjusted under 35 U.S.C. 154(b) by 0 days.

(21) Appl. No.: 17/455,620

(22) Filed: Nov. 18, 2021

Related U.S. Application Data

(63) Continuation of application No. 17/245,826, filed on Apr. 30, 2021, now Pat. No. 11,220,182.

(51) Int. Cl.
*B60K 35/00* (2006.01)
*G06F 3/041* (2006.01)
*G06F 3/0488* (2022.01)

(52) U.S. Cl.
CPC ............ *B60K 35/00* (2013.01); *G06F 3/0412* (2013.01); *G06F 3/0488* (2013.01);
(Continued)

(58) Field of Classification Search
CPC ...... G09G 5/00; H05K 5/02; B60K 2370/126; B60K 2370/11; B60K 2370/158; B60K 2370/67; B60K 2370/55; B60K 2370/172; B60K 2370/1438; B60K 35/00; G06F 3/0412; G06F 3/0488; G06F 2203/04105
See application file for complete search history.

(56) References Cited

U.S. PATENT DOCUMENTS 9,489,500 B2 * 11/2016 Takenaka ........... G01C 21/3664
10,015,442 B1 * 7/2018 Maltezos ............... H04N 7/142
(Continued)

OTHER PUBLICATIONS

Article entitled "Mitsubishi Electric entwickelt Rotations-Bildschirm," 2 pages, by Holger Wittich, Nov. 8, 2021. Retrieved from Internet: < https://www.auto-motor-und-sport.de/tech-zukunft/drehbarer-infotainment-screen-von-mitsubishi-electric/ >.
(Continued)

*Primary Examiner* — Christopher E Leiby
(74) *Attorney, Agent, or Firm* — Finnegan, Henderson, Farabow, Garrett & Dunner LLP

(57) ABSTRACT

An apparatus and methods for rotating a console display device of a vehicle are disclosed. The apparatus includes a display device; a rotation mechanism connected to the display device and configured to rotate the display device between a portrait orientation and a landscape orientation; a touch bar having at least one button; and a memory storing instructions. The instructions include receiving a request from a user via the touch bar to rotate the display device from the portrait orientation to the landscape orientation; sending a message to the user via the display device providing a time for the user to cancel the request; executing, via the rotation mechanism, a rotation of the display device from the portrait orientation to the landscape orientation after the provided time to cancel the request elapses: and sending a signal to disable vehicle movement.

19 Claims, 6 Drawing Sheets

(52) U.S. Cl.
CPC ... *B60K 2370/11* (2019.05); *B60K 2370/1438* (2019.05); *B60K 2370/158* (2019.05); *B60K 2370/172* (2019.05); *B60K 2370/55* (2019.05); *B60K 2370/67* (2019.05); *G06F 2203/04105* (2013.01)

(56) References Cited

U.S. PATENT DOCUMENTS

| | | | | |
|---|---|---|---|---|
| 10,504,342 | B1* | 12/2019 | Khoshkava | G08B 6/00 |
| 2003/0125873 | A1* | 7/2003 | Yamaguchi | B60K 35/00 345/204 |
| 2006/0256094 | A1* | 11/2006 | Inagaki | G01C 21/3611 345/173 |
| 2010/0164336 | A1* | 7/2010 | Lee | B60K 35/00 312/29 |
| 2011/0193783 | A1* | 8/2011 | Kim | G06F 1/1624 345/169 |
| 2012/0262868 | A1* | 10/2012 | Kato | B60R 11/0235 361/679.21 |
| 2016/0059864 | A1* | 3/2016 | Feit | H04M 1/6075 701/36 |
| 2018/0370363 | A1* | 12/2018 | Vinogradov | B60K 37/04 |
| 2019/0071055 | A1* | 3/2019 | Luchner | G06V 40/168 |
| 2020/0020334 | A1* | 1/2020 | Kang | G06F 3/02 |
| 2020/0257418 | A1* | 8/2020 | Strandberg | G06F 3/0482 |
| 2020/0307513 | A1* | 10/2020 | Chung | B60R 25/25 |
| 2021/0129672 | A1* | 5/2021 | Ahn | B60K 37/06 |
| 2021/0179130 | A1* | 6/2021 | Tsujino | B60W 50/12 |
| 2021/0284021 | A1* | 9/2021 | Cheng | B60K 37/06 |
| 2021/0284022 | A1* | 9/2021 | Lee | B60W 40/08 |

OTHER PUBLICATIONS

Article entitled "Mitsubishi Electric Unveils Digital Cockpit Demo Vehicle," 8 pages, by Jim Irwin, Aug. 6, 2021. Retrieved from Internet: < https://www.wardsauto.com/interiors/mitsubishi-electric-unveils-digital-cockpit-demo-vehicle >.

Screen captures from video entitled "Mitsubishi Electric Project Firebird Digital Cockpit," 7 pages, posted by Mitsubishi Electric Automotive America, Aug. 17, 2021. Retrieved from Internet: <https://www.facebook.com/MitsubishiElectricAutomotiveAmerica/videos/mitsubishi-electric-project-firebird-digital-cockpit/372255337786747/>.

Screen captures from video entitled "Rotating Screen Highlights Mitsubishi Electric's Digital Cockpit—CAR MBS 2021," 3 pages, posted by Autoline Network, Aug. 4, 2021. Retrieved from Internet: <https://www.youtube.com/watch?v=9Z_WI5N3Jhk>.

* cited by examiner

ROTATING VEHICLE CENTER INFORMATION DISPLAY WITH STATIONARY BUTTONS AND TOUCH BAR

CROSS-REFERENCE TO RELATED APPLICATION

This application is a continuation of application Ser. No. 17/245,826, filed Apr. 30, 2021, the contents of which is incorporated herein by reference in its entirety.

TECHNICAL FIELD

The present disclosure generally relates to apparatus, construction, and methods of use of rotatable information displays in vehicles. Embodiments of the present disclosure relate to inventive and unconventional apparatus and methods for providing vehicle information on an automatically rotatable display with haptic feedback.

BACKGROUND

A display device capable of providing various information may be installed around the driver's seat of a vehicle. The display device can provide various information about a route from a departure to a destination location, current location of the vehicle, and other location-related information. In addition, the display device can display a wide variety of other information including, playing music or movies, display received terrestrial or satellite broadcasts, and provide information on the status of the vehicle or other information for user convenience or interest, such as weather and news.

Driving information is optimally displayed in a vertical orientation, so that a driver may quickly view information on the screen without turning his or her head, while entertainment media is often displayed in a horizontal orientation. A stationary display device may not be capable of providing the same ease and safety that a driver may desire while operating and controlling a vehicle, while also optimizing the display device for entertainment use.

Conventional vehicles, having a stationary display device, are unable to change the orientation of the display device to provide the driver or user maximum utility while driving and optimized entertainment experience while parked. For example, conventional stationary vehicle displays may play widescreen movies across the narrow dimension of a vertical screen in portrait format, leaving much of the screen unused. While conventional vehicles may provide one or more additional displays behind the driver for enjoyment of passengers in back seats, passengers in the front seats are unable to view media in its original, widescreen format, or may be unable to view the displayed media at all.

Therefore, there is a need for improved methods and apparatus for rotatable vehicle information displays optimizing the display for use by the driver during vehicle operation while also optimizing the display for entertainment use by the driver and/or passengers when the vehicle is stopped or parked.

SUMMARY

One aspect of the present disclosure is directed to an apparatus for rotating a console display device of a vehicle. The apparatus comprises a display device; a rotation mechanism connected to and cooperating with the display device and configured to rotate the display device between a portrait orientation and a landscape orientation; a touch bar having at least one button; a memory storing instructions; and at least one processor configured to execute the instructions to perform steps. In one aspect of the disclosure, the steps include receiving a request from a user via the touch bar to rotate the display device from the portrait orientation to the landscape orientation; sending a message to the user via the display device providing a time for the user to cancel the request; executing, via the rotation mechanism, a rotation of the display device from the portrait orientation to the landscape orientation after the provided time to cancel the request elapses; and sending a signal to disable vehicle movement.

Another aspect of the present disclosure is directed to a method for rotating a console display device of a vehicle. The method includes the steps of receiving a request from a user via a touch bar to rotate the display device from a portrait orientation to a landscape orientation; sending a message to the user via the display device providing a time for the user to cancel the request; executing, via a rotation mechanism, a rotation of the display device from the portrait orientation to the landscape orientation after the provided time to cancel the request elapses; and sending a signal to disable vehicle movement.

Yet another aspect of the present disclosure is directed to display system for a vehicle. The apparatus includes a first display device; a rotation mechanism connected to and cooperating with the first display device and configured to rotate the first display device between a portrait orientation and a landscape orientation; a second display device; a memory storing instructions; and at least one processor configured to execute the instructions to perform steps. The steps include receiving a request from a user via a second GUI of the second display device to rotate the first display device from a portrait orientation to a landscape orientation wherein the second display device is stationary; sending a message to the user via a first GUI of the first display device providing a time for the user to cancel the request; executing, via the rotation mechanism, a rotation of the first display device from the portrait orientation to the landscape orientation after the provided time to cancel the request elapses; and sending a signal to disable vehicle movement.

Other apparatus and methods are also discussed herein.

DETAILED DESCRIPTION

Figure 1:
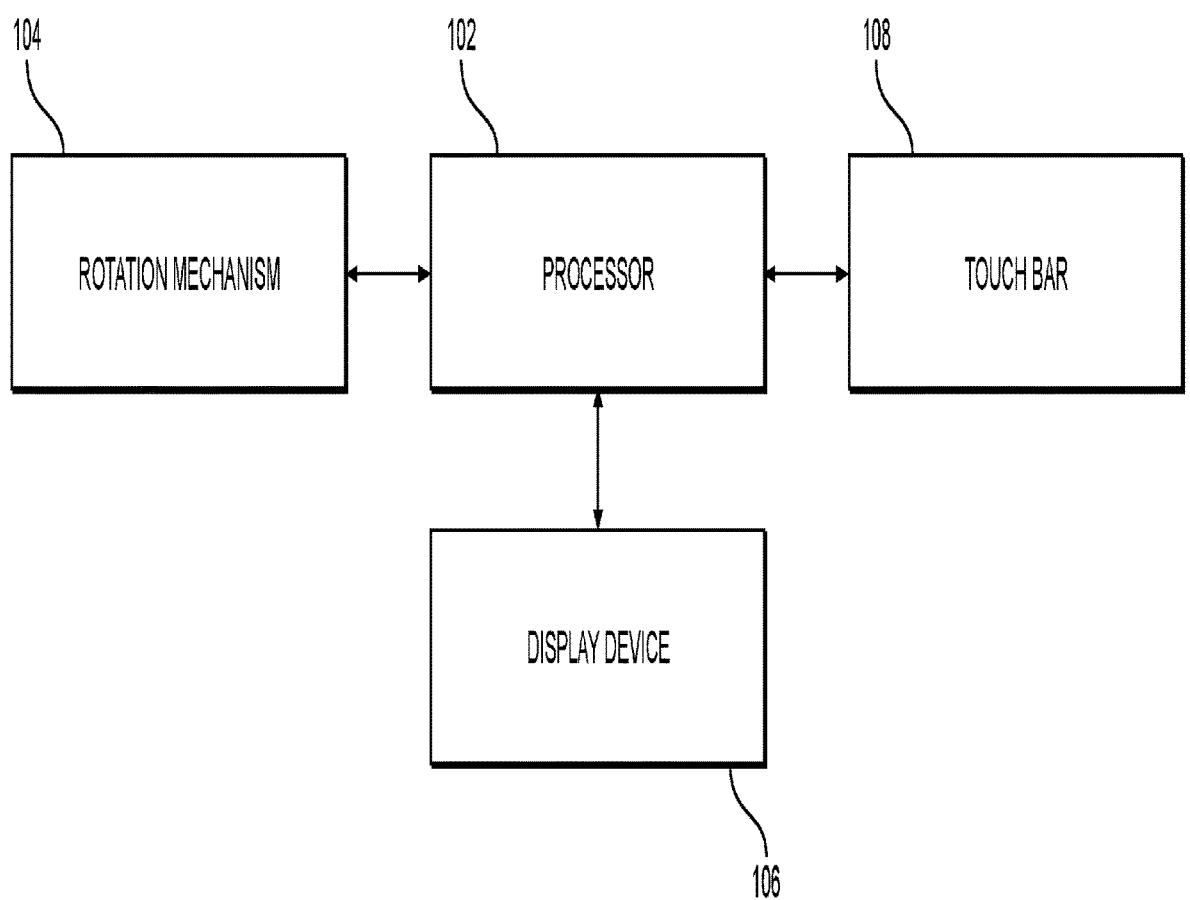
FIG. 1 is a schematic block diagram illustrating an exemplary system for rotating a console display device of a vehicle, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Rather, the proper scope of the invention is defined by the appended claims.

Embodiments of the present disclosure are directed to apparatus and methods configured for rotating a console display of a vehicle between two modes of vehicle operation. The first mode may be a drive mode where a display may be in a portrait configuration, and the second mode may be an entertainment mode where the display may rotate to a landscape configuration. In some embodiments, the display may be in a landscape configuration in a drive mode, and in a portrait configuration in an entertainment mode. Thus, entertainment mode may differ from drive mode in that the display may be rotated approximately 90 degrees in entertainment mode relative to drive mode.

Furthermore, embodiments of the present disclosure may be directed to apparatus and methods configured to allow a driver to access information concerning operation of a vehicle, including environment settings and vehicle performance settings, via a display screen while driving the vehicle. Moreover, embodiments of the present disclosure may be directed to apparatus and methods configured to provide an entertainment mode (e.g., for viewing movies, music videos, accessing the internet) wherein the display screen may be rotated to maximize the viewing area and content of the display. The entertainment mode may be limited to operating when the vehicle is stopped or parked.

Furthermore, embodiments of the present disclosure may be directed to apparatus and methods configured to use two display screens in a vehicle that provide haptic feedback to a user or driver during both the drive mode and the entertainment mode.

FIG. 1 is a schematic block diagram illustrating an exemplary system for rotating a console display of a vehicle, consistent with some embodiments of the present disclosure. As illustrated in FIG. 1, system 100 may include one or more processor 102 and memory storing instructions (not shown). System 100 may also include rotation mechanism 104, display device 106, and touch bar 108. Rotation mechanism 104 may be connected to the display device and configured to rotate the display device between portrait orientation and landscape orientation. Further, touch bar 108 may have a touchscreen and/or at least one physical buttons. Processor 102 may provide information to display device 106 for display to passengers in a vehicle, for example, information regarding the status, operation, and/or control of a vehicle, referred to herein as vehicle information. Processor 102 may send vehicle information to the display 108. In some embodiments, system 100 may also include a second display device. For example, the second display device may be disposed near first display device 106 and provide information to passengers such as vehicle battery charge level, exterior temperature, or current time. Second display device may also be incorporated into or constitute touch bar 104. Processor 102 may store information received from a user interacting with display device 106 in a database that may be accessed directly (e.g., via physical connection), or remotely (e.g., via wireless connection). Display device 106 may be a touchscreen.

Figure 2A:
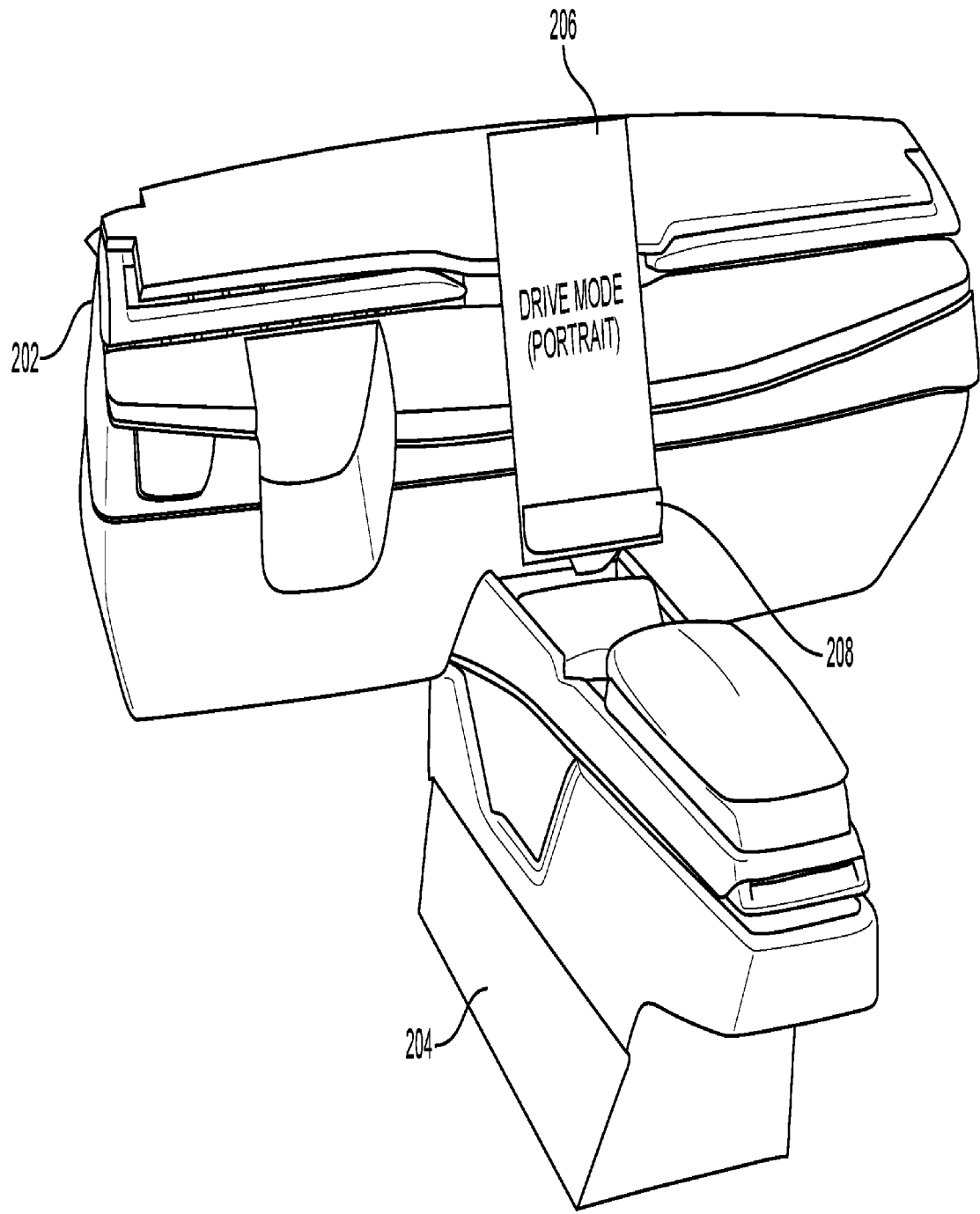
FIG. 2A is an exemplary illustration of a rotating console display device of a vehicle in a portrait orientation, consistent with some embodiments of the present disclosure.

FIG. 2A illustrates rotating console display device of a vehicle in a portrait orientation, consistent with some embodiments of the present disclosure. The drive mode, as used herein, may refer to an operating mode in which a vehicle is permitted to move. As illustrated in FIG. 2A, vehicle interior may include dashboard 202, center console 204, display 206 (also referred to as display device 106) in drive mode, and touch bar 208 (also referred to as touch bar 108) in a vehicle. Display 206 and touch bar 208 may be located at the center of dashboard 202 and above the center console. Processor 102 may provide a GUI for display on display device 206. Display device 206 and touch bar 208 may together or independently provide a user with vehicle information.

In drive move, processor 102 may orient display device 206 in a portrait orientation, allowing a user to access general information regarding the operation and control of the vehicle via a GUI. Processor 102 may set the portrait orientation as a default orientation of display device 206. In some embodiments, the vehicle may be prevented from driving unless display device 206 is in portrait orientation.

In one embodiment, some operations and controls of the vehicle may be actuated by a GUI of display device 206. For instance, a driver may use display device 206 to perform operations including starting the engine, shutting off the engine, setting the vehicle in different automatic transmissions (e.g., park, reverse, neutral, drive, low gear ratio, first two gears, or first three gears), gear selection of manual transmission, setting the engine fuel efficiency, setting the engine in hybrid mode, setting the engine in only fuel mode, setting the engine in all electric mode, or any other operation and control or combination thereof. In another embodiment, the GUI of display device 206 may include features such as media information (e.g., radio stations information, satellite radio information, and compact disk information), cell phone information (e.g., cell phone applications and call management), vehicle status information (e.g., vehicle maintenance, vehicle speed, engine performance, fuel amount, and battery charge status), navigation information, vehicle interior and exterior environment information (e.g., interior temperature, air conditioning settings, heating settings, and exterior weather information and conditions), vehicle communication connection information (e.g., Bluetooth™ status, wireless interface, and cell signal strength), or any other information or combination thereof. Display device 206 may also provide the user with touch screen interactions with haptic feedback. For instance, processor 102 may cause forces, vibrations, noise, lights, or motions in response to the user touching elements of the GUI on display device 206. In some embodiments, processor 102 may cause haptic feedback using rotation mechanism 104.

In some embodiments, touch bar 208 may also include second display. Second display may also be a touchscreen. Processor 102 may provide a user with information regarding the operation and control of the vehicle via a second GUI on the second display. Second GUI of second display may provide user with control of general information selected in display device 206.

In another embodiment, touch bar 208 may include fingerprint reader, and processor 102 may grant access to the vehicle when a user's fingerprint matches a stored fingerprint. Processor 102 may grant tiered access to vehicle features. For example, high access tier may permit user to control general information shown on display device 206

(e.g., increasing or decreasing the temperature in the vehicle, starting the engine of the vehicle, setting the vehicle in drive mode or entertainment mode, setting the vehicle in a specific automatic transmission mode, changing the radio station in the vehicle, calling a person via a cell phone through Bluetooth™ or wireless technology, starting the engine, shutting off the engine, or any other specific information control or combination thereof). Low access tier, for example, for children, may permit manipulation of climate controls and entertainment options but not mechanical operation of the vehicle.

In another embodiment, touch bar 208 may provide user with touch screen interactions with haptic feedback. For instance, processor 102 may cause forces, vibrations, noise, lights, or motions in response to the user touching elements of touch bar 208, such as certain areas of a touchscreen on touch bar 208. Forces may be caused via a motor connected to touch bar 208, or via a motor or other device connected to other components of the vehicle, such as a motor attached to a seat.

Processor 102 may optimize information displayed via a GUI by managing the use of visible areas display device 206 and touch bar 208. In one embodiment, processor 102 may utilize a portion of display device 206 during drive mode that is not obstructed by touch bar 208 to display vehicle information, and/or may replicate an obstructed portion on a display of touch bar 208. For example, processor 102 may optimize display device 206 to not display information in a portion of display device 206 obstructed by touch bar 208. Additionally or alternatively, processor 102 may provide a first GUI on the display device; and provide a second GUI on a touchscreen disposed on the touch bar.

Figure 2B:
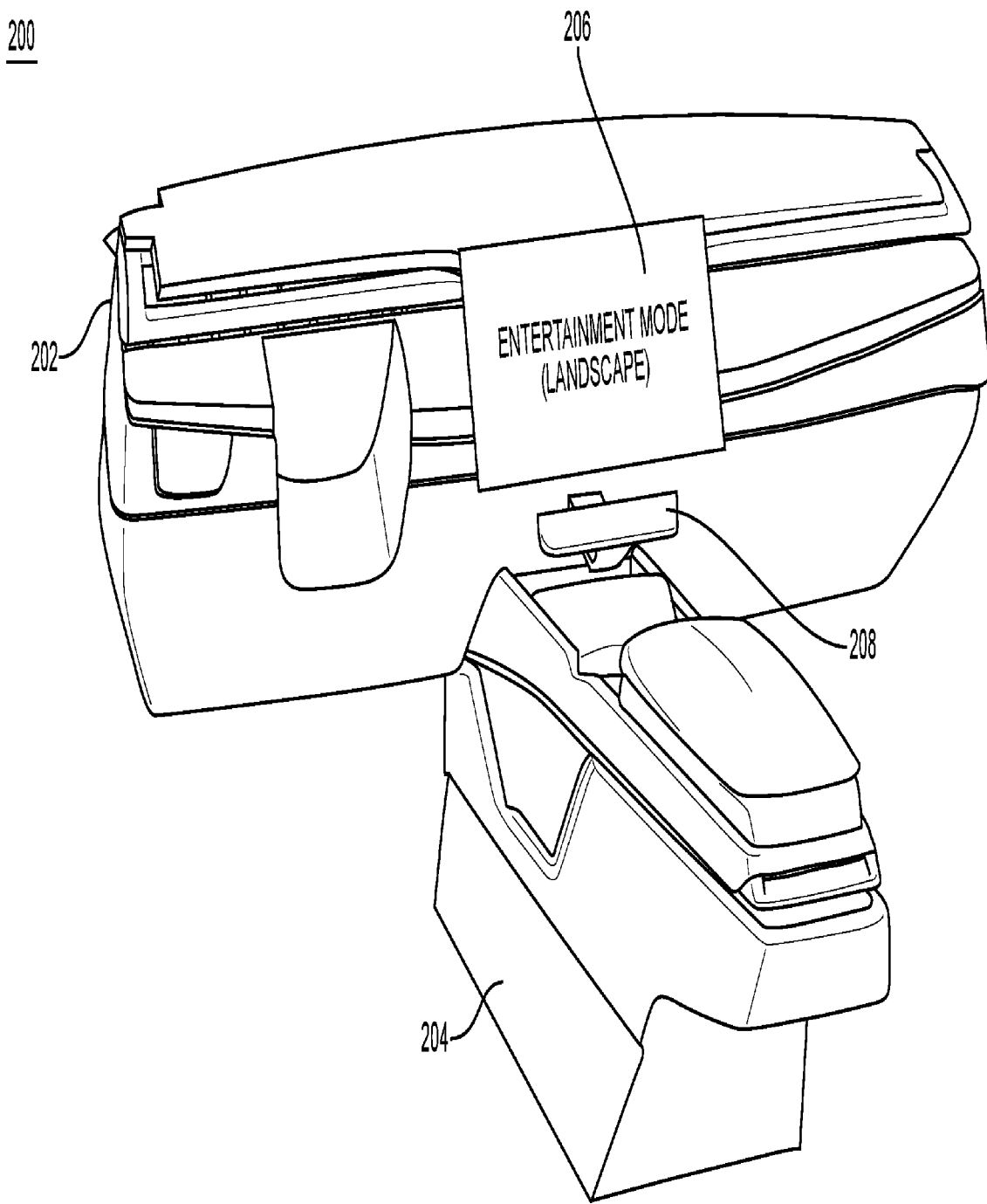
FIG. 2B is an exemplary illustration of a rotating console display device of a vehicle in a landscape orientation, consistent with some embodiments of the present disclosure.

FIG. 2B illustrates an exemplary illustration of a rotating a console display of a vehicle in a landscape orientation, consistent with some embodiments of the present disclosure. Entertainment mode, as disclosed herein, may refer to an operating mode available when the vehicle is stopped or parked. In entertainment mode, user such as a passenger or driver, may view movies, music videos, news, television, native and cloud based gaming, vehicle information, or other features. When the vehicle is in entertainment mode, display device 206 may have a landscape orientation, as shown in FIG. 2B, that differs from the portrait orientation in drive mode shown in FIG. 2A. Processor 102 may rotate information displayed on display device 206 by 90 degrees in the clockwise or counter-clockwise direction. Further, processor 102 may reshape the information to accommodate the landscape orientation. Touch bar 206 may remain unmoved between the drive mode shown in FIG. 2A and the entertainment mode shown in FIG. 2B. In some embodiments, touch bar 206 may move to avoid obscuring display device 206, such as by folding underneath display device 206 or moving vertically.

Users may activate a change in orientation of display device 206 when a vehicle is stopped or parked. For example, user may send a request to processor 102 via button of touch bar 208 or GUI presented on touchscreen of touch bar 208 initiating rotation of display device 206 from portrait orientation to landscape orientation, or to return display device 206 from landscape to portrait orientation. The user request may be triggered by a long press of a button, such as a home button, for instance, or by touching a dedicated button for rotating the screen that may be disposed above a home button. In some embodiments, GUI displayed on display device 206 may provide user with the option to rotate display device 206, such as in embodiments providing a display device without touch bar. The screen may also be rotated automatically when the vehicle is placed into park, and the vehicle may provide a user with a cancel rotation option, such as via a touch screen. Further, touch bar may include a reverse rotation button, and processor 102 may execute a rotation of the display device from the landscape orientation to the portrait orientation. Processor 102 may re-enable vehicle movement once display device 206 returns to the portrait orientation.

In some embodiments, vehicle may engage entertainment mode when user selects entertainment mode using an option on GUI or touch bar, and the vehicle is stopped or parked. Alternatively, entertainment mode may automatically engage when the vehicle is stopped or parked and then moved or turned on, respectively. In some embodiments, processor 102 may allow user to set default orientation of display device 206 when vehicle is parked.

Additionally, processor 102 may provide message on display device 206 confirming an impending rotation movement and providing time for user to cancel the request if desired. If user provides no request to processor 102 to cancel rotation, processor 102 may execute rotation using rotation mechanism 104. In this manner, processor 102 may allow drivers to prevent errant inputs, such as by an animal or child, or the driver him or herself, accidentally pressing button on touch bar 208.

In one embodiment, processor 102 may prevent the vehicle from being driven while in landscape orientation by sending signal to disable vehicle movement, for instance, to vehicle control processor. Alternatively or additionally, processor 102 may receive signal that vehicle has transitioned into drive mode, and automatically return display device 206 to portrait mode. For example, a driver may enter entertainment mode while stopped in heavy traffic during construction. When traffic begins moving, driver may suddenly shift into drive and begin moving. However, doing so while display device 206 is in landscape mode may be dangerous. Therefore, processor 102 may receive signal, such as from vehicle control module or processor, indicating that gear selector of vehicle has been moved to drive mode. In response to this indication, processor 102 may automatically execute reverse rotation of display device from landscape orientation to portrait orientation. In some embodiments, processor 102 may provide delay before returning screen to portrait orientation, or may return to portrait orientation after the vehicle exceeds a certain speed. This may be beneficial in heavy stop-and-go traffic, wherein driver drives a short distance before shifting to park again, so that driver need not repeatedly enter and exit entertainment mode.

Processor 102 may utilize the entire area of display device 206 to provide entertainment to user. Processor 102 may also coordinate the interaction of first GUI on display device 206 and second GUI on screen of touch bar 208. For instance, processor 102 may utilize first GUI to receive request from user regarding selection (e.g., movie, channel, song, music video, slide show, album, photo, video, or any other content or combination thereof), turning vehicle's engine on or off, or any other combination thereof. Processor 102 may also use second GUI to receive user input to fast-forward streaming video content or music, pause streaming video content or music, reverse streaming video content or music, or switch to drive mode. Components of first and second GUIs may be replicated, or reversed from that described herein. For example, first GUI rather than second GUI may enable switching to drive mode.

Processor 102 may also allow user to select content or take pictures based on the entertainment shown on display device 206. The user may use one or more fingers to zoom in, zoom out, or capture a certain frame. Processor 102 may also receive inputs according to touch sequences, such as user touching once, double touching, or any other combination of touches thereof to pause, fast-forward, reverse, or slow-down the entertainment content shown. Processor 102 provide haptic feedback responses via display device 206 and/or touch bar 208, as described above, to user in vehicle.

Figure 3:
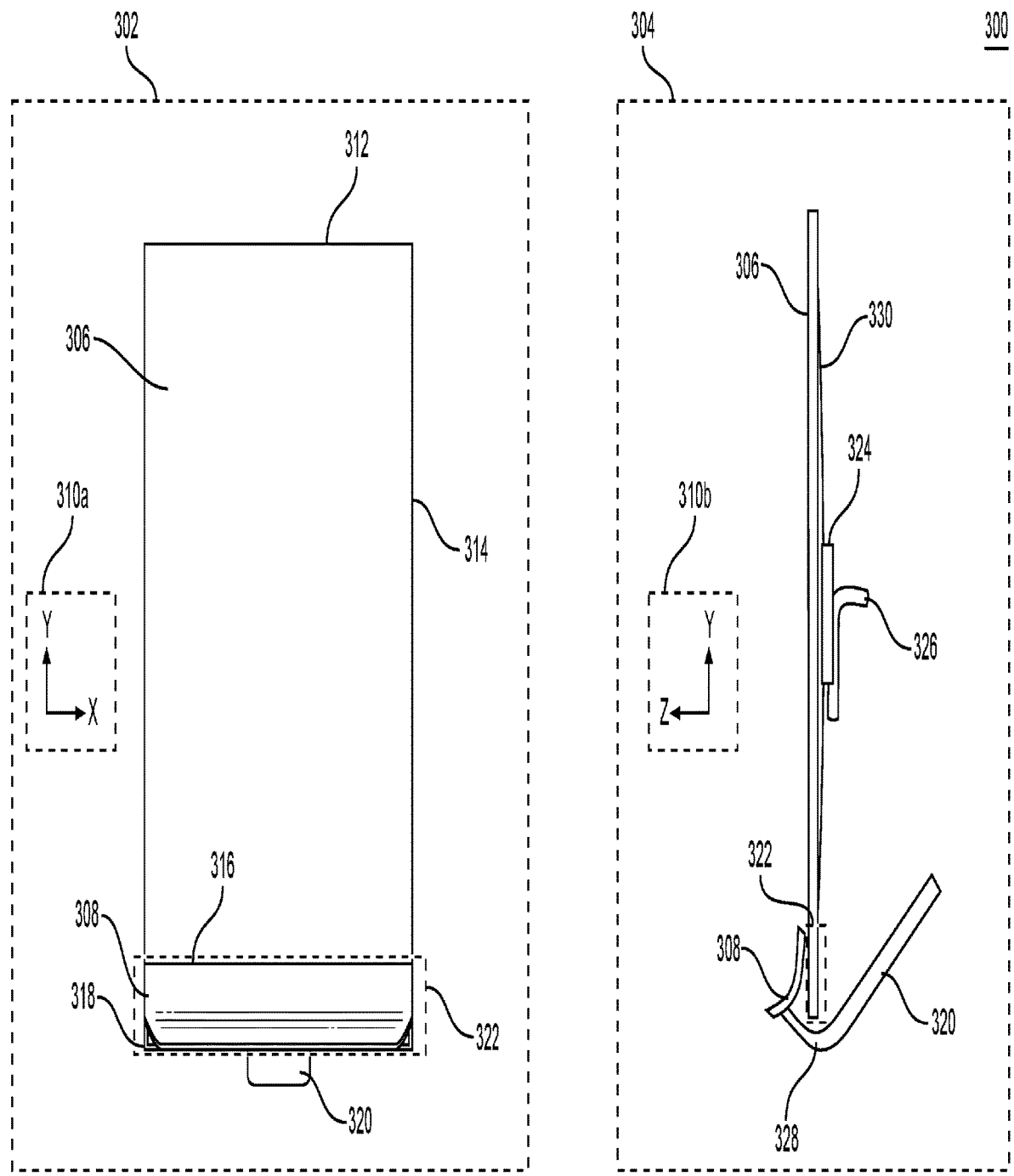
FIG. 3 is an exemplary illustration of a display and a touch bar in drive mode, consistent with some embodiments of the present disclosure.

FIG. 3 is an exemplary illustration of display and touch bar in drive mode, consistent with some embodiments of the present disclosure. FIG. 3 illustrates front view 302 and side view 304 of display device 306 and touch bar 308. Front view 302 provides coordinate system 310*a* showing orientation of display device 306 (also illustrated as display device 106 and display device 206) and touch bar 308 (also illustrated as touch bar 108 and touch bar 208). Display device 306 may have rectangular shape with first side 312, which may be aligned with the "X" direction of coordinate system 310*a* having "X" and "Y" directions. Display device 306 may also have second side 314, which may be aligned with the "Y" direction of coordinate system 310*a*. A length of first side 312 may be less than or equal to a length of second side 314.

Touch bar 308 in front view 302 may also have rectangular shape with side 316 having, for instance, equal length to first side 312 of display device 306. Touch bar 308 has side 318 that may be shorter than side 316. Touch bar 308 may be positioned in front lower portion of display device 306 by stand 320, as depicted in side view 304. Touch bar 308 may float in front of display device 306 because of its position with respect to display device 306 via stand 320. Stand 320 may hold touch bar 308 in a stationary manner. Touch bar 308 may obscure part of surface area 322 of display device 306. As a result, processor 102 may optimize the display of display device 306 to move items away from the obscured area or to replicate the obscured area onto a display of touch bar 308.

Side view 304 depicts coordinate system 310*b*, which is complementary to coordinate system 310*a* in front view 302. Coordinate system 310*b* shows "Y" direction of coordinate system 310*a* and "Z" direction. In side view 304, display device 306 is shown with screen being orthogonal to the "Z" direction of coordinate system 310*b*. Display device 306 may include casing 330, which may be located on opposite side of screen of display device 306 in side view 304. Casing 330 may contain haptic feedback hardware. In some embodiments, a piezoelectric actuator may provide haptic feedback.

Casing 330 may also support rotation mechanism 324. In addition to rotating, rotation mechanism 324 may move display device 306 up and down in "Y" direction of coordinate system 310*b*, and/or fore and aft in "Z" direction. Rotation mechanism 324 may rotate display device 306 in clockwise and counter-clockwise about "Z" axis. Rotation mechanism 324 may be attached on mount 326. Rotation mechanism 324 may be pivotable joint such as ball-joint, spherical joint, swivel, roller, spherical cam joint, gimbal bearing, or any combination thereof to permit rotation in three degrees of freedom (i.e., rotation about "X", "Y", and "Z" direction of coordinate system 310*b*). This may allow user to pivot display device 306 to different viewing angles. Rotation mechanism 324 may also include piston, prismatic joint, sliding piston, or roller configured to permit translation about the "X", "Y", and "Z" direction of coordinate system 310*b*. Mount 326 may be configured as v-groove to accommodate the rotation and translation degrees of freedom of the rotation mechanism 324. In one embodiment, processor 102 may induce one or more motors in casing 330 and/or rotation mechanism 324 to rotate display device 306 with respect to the mount stand 326.

As shown in side view 304, touch bar 308 may comprise screen having a curved shape. In some embodiments, surface behind screen of touch bar 308 may also have curved shape that may be similar or different from that of screen. Alternatively, touch bar 308 may be flat. Stand 320 may be configured such that screen of touch bar 308 covers surface area 322 of display device 306. Stand 320 may have curved portion 328 to accommodate the bottom surface or surface area 322 of display device 306.

Figure 4:
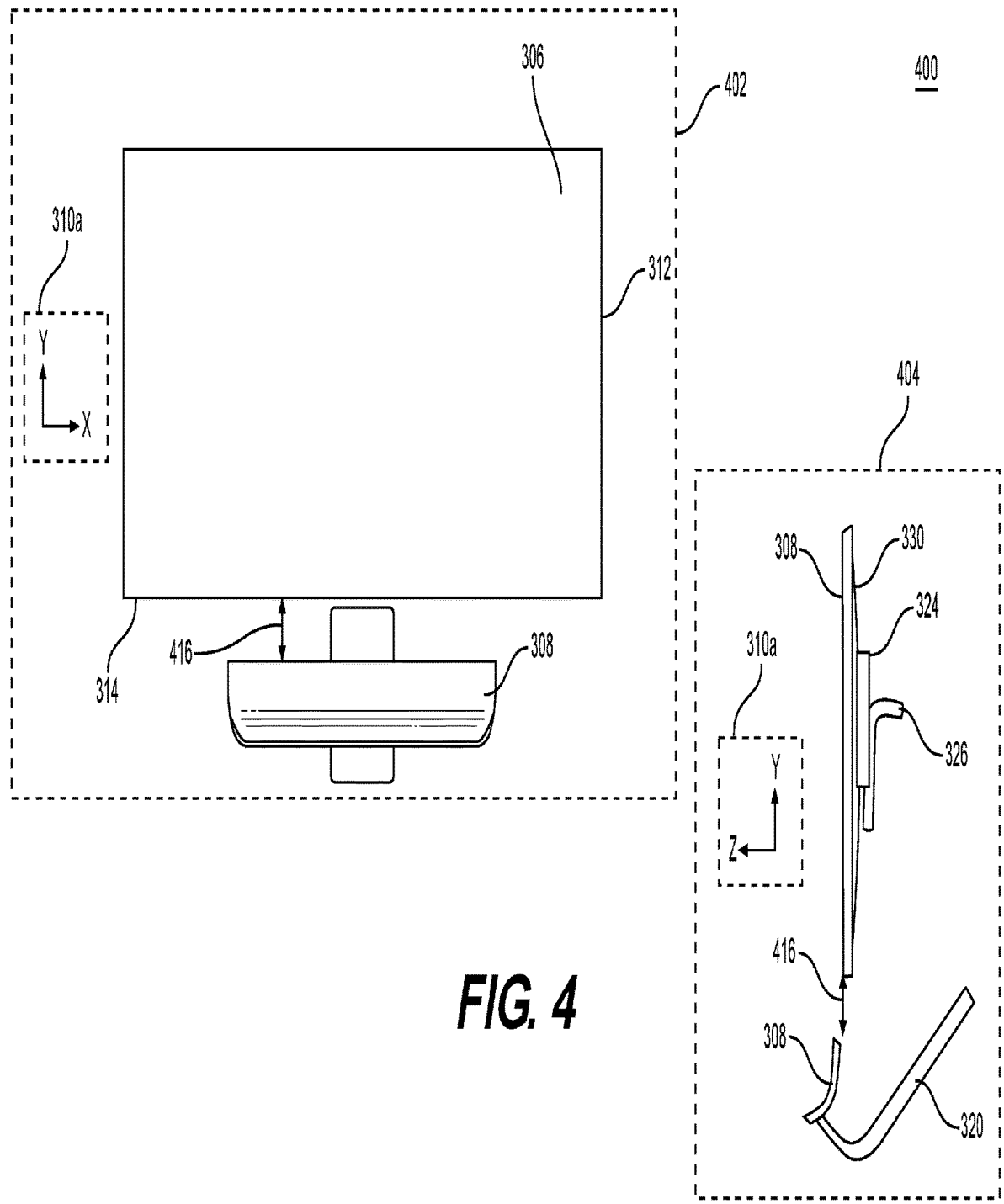
FIG. 4 is an exemplary illustration of a display and a touch bar in entertainment mode, consistent with some embodiments of the present disclosure.

FIG. 4 is an exemplary illustration of a display and a touch bar in entertainment mode, consistent with some embodiments of the present disclosure. FIG. 4 illustrates front view 402 and side view 404 of display device 306 in landscape orientation. Front view 402 has coordinate system 310*a* showing orientation of display device 306 and touch bar 308. Second side 314 of display device 306 is aligned with "X" direction of coordinate system 310*a*. First side 312 is aligned with "Y" direction of coordinate system 310*a*. Display device 306 may have been rotated about "Z" axis by 90 degrees in either clockwise or counter-clockwise direction of coordinate system 310*b*. Further, as shown in side view 404 of FIG. 4, when display device 306 is in landscape mode, touch bar 308 may be separated from display device 306 in the "Y" direction of coordinate system 310*a* by clearance 416 such that there is no overlap of display device 306 by touch bar 308. In some embodiments, stand 320 may move to position touch bar 308 closer to display device 306, for example, by shifting touch bar 308 upward along the "Y" axis.

Figure 5:
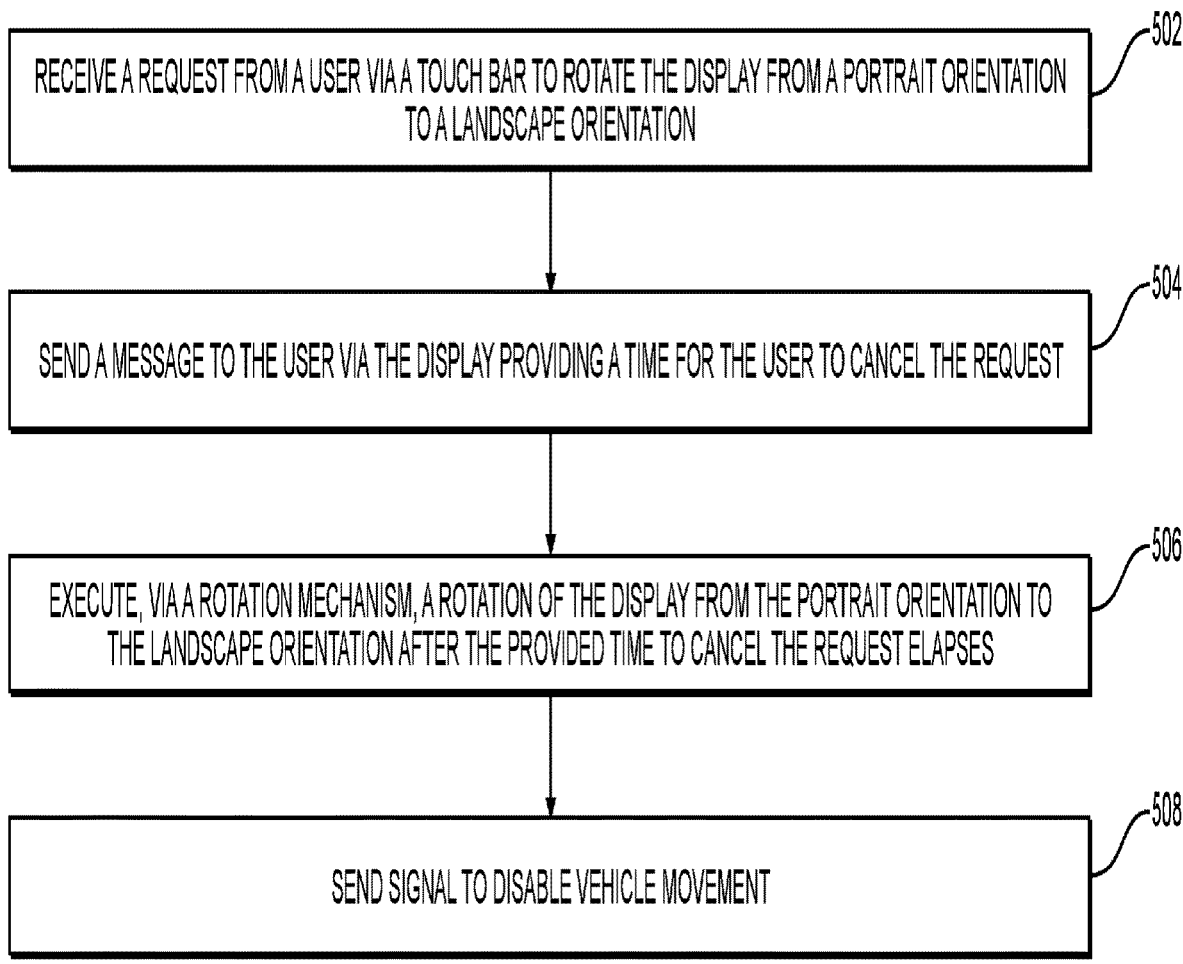
FIG. 5 is a flow chart of an exemplary method for rotating a console display of a vehicle, consistent with some embodiments of the present disclosure.

FIG. 5 is a flow chart of an exemplary method for rotating console display of vehicle, consistent with some embodiments of the present disclosure. The steps of method 500 may be performed by processor 102. At step 502, processor 102 receives request from user via touch bar to rotate display from portrait orientation to landscape orientation. Further, at step 502, processor 102 may confirm that the vehicle is stopped or parked. At step 504, processor 102 sends message to user via display providing time for user to cancel request.

At step 506, processor 102 executes, via rotation mechanism, rotation of display from portrait orientation to landscape orientation after the provided time to cancel request elapses. During execution of step 506, processor 102 may monitor movement of display device 206 to detect interferences with movement. For instance, a package or person may obstruct rotation of display device 206. Thus, system 100 may further include a force sensor configured to measure force opposing the rotation of the display device, and processor 102 may reverse the rotation in response to the force opposing the rotation of the display device exceeding a threshold. This may prevent damaging display device 206, rotation mechanism 324, or any persons or packages in the vehicle that are obstructing the proposed movement. Additionally, at step 508, processor 102 sends signal to disable vehicle movement.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus for rotating a console display device of a vehicle, the apparatus comprising:
    a display device;
    a rotation mechanism connected to the display device and configured to move the display device between a portrait orientation and a landscape orientation;
    a touchscreen configured to remain relatively stationary when the display device moves;
    a memory storing instructions; and
    at least one processor configured to execute the instructions to perform steps comprising:
        receiving a request from a user via the touchscreen or the display device to move the display device from the portrait orientation to the landscape orientation, wherein the at least one processor prevents driving unless the display device is in the portrait orientation;
        sending a message to the user via the display device providing a time for the user to cancel the request; and
        executing, via the rotation mechanism, a movement of the display device to return to the portrait orientation after the provided time to cancel the request elapses.

2. The apparatus of claim 1, wherein the display device comprises a GUI.

3. The apparatus of claim 1, wherein the display device provides touchscreen interactions with haptic feedback.

4. The apparatus of claim 1, wherein the touchscreen comprises a GUI of a reverse movement input configured to:
    receive a reverse request from a user via the touchscreen to move the display device from the landscape orientation to the portrait orientation; and
    execute, via the rotation mechanism, a reverse movement of the display device from the landscape orientation to the portrait orientation.

5. The apparatus of claim 1, wherein the rotation mechanism is connected to the display device using a pivotable joint.

6. The apparatus of claim 1, wherein the display device and the touchscreen are centered relative to the vehicle's dashboard.

7. The apparatus of claim 1, wherein the display device and the touchscreen are positioned above a console.

8. The apparatus of claim 1, further comprising:
    a force sensor configured to measure a force opposing the movement of the display device; and
    the instructions to perform steps further comprise:
        reversing movement in response to the force opposing the movement of the display device exceeding a threshold.

9. The apparatus of claim 1, wherein the steps further comprise:
    receiving an indication that a gear selector of the vehicle has been moved to a drive mode; and
    executing a reverse movement of the display device from the landscape orientation to the portrait orientation.

10. The apparatus of claim 1, wherein the at least one processor is further configured to perform steps comprising:
    providing a first GUI on the display device;
    providing a second GUI disposed on the touchscreen;
    wherein the second GUI displays information of the first GUI that is obstructed by the touchscreen.

11. A method for rotating a console display device of a vehicle, the method comprising:
    receiving a request from a user via a touchscreen to move the display device from a portrait orientation to a landscape orientation, wherein the touchscreen is configured to remain relatively stationary during movement of the display device, wherein at least one processor prevents driving unless the display device is in the portrait orientation;
    sending a message to the user via the display device providing a time for the user to cancel the request; and
    executing, via a rotation mechanism, a movement of the display device to return to the portrait orientation after the provided time to cancel the request elapses.

12. The method of claim 11, wherein the display device comprises a GUI.

13. The method of claim 11, wherein the display device provides touchscreen interactions with haptic feedback.

14. The method of claim 11, wherein the at least one processor is configured to:
    receive a request from a user via the touchscreen to move the display device from the landscape orientation to the portrait orientation; and
    execute, via the rotation mechanism, a movement of the display device from the landscape orientation to the portrait orientation.

15. The method of claim 11, wherein the rotation mechanism is connected to the display device using a pivotable joint.

16. The method of claim 11, wherein the display device and the touchscreen are centered relative to the vehicle's dashboard.

17. The method of claim 11, wherein the display device and the touchscreen are positioned above a console.

18. The method of claim 11, further comprising:
    measuring a force opposing the movement of the display device; and
    reversing the movement in response to the force opposing the movement of the display device exceeding a threshold.

19. The method of claim 11, further comprising:
    receiving an indication that a gear selector of the vehicle has been moved to a drive mode; and
    executing a reverse movement of the display device from the landscape orientation to the portrait orientation.

* * * * *